Fig. 2

United States Patent Office 2,896,468
Patented July 28, 1959

2,896,468

AUTOMATIC PLURAL STEP-RATIO TRANSMISSIONS

Forrest R. Cheek and Norman Reighard, Detroit, Mich., assignors to General Motors Corporation, Detroit, Mich., a corporation of Delaware Application September 23, 1954, Serial No. 457,975

6 Claims. (Cl. 74—472)

This invention relates to automatic plural step-ratio transmissions and more particularly to such transmissions employing a plurality of planetary gear units with a fluid coupling functionally interposed between gear units for providing drive of the vehicle in which the transmission is mounted.

The present invention constitutes an improvement over the transmission illustrated and described in the copending applications of Walter B. Herndon, Serial No. 235,213, filed July 5, 1951, now Patent No. 2,790,327 for Transmission Control System, and Serial No. 295,519, filed June 25, 1952, now abandoned, for Transmission Control System. The transmission disclosed in the above applications comprises first and second planetary gear units, the driving element of the first unit being driven directly by the engine, and the driven element thereof serving to drive a fluid coupling, the output of which in turn is connected to a driving element of the second planetary unit. In addition, the driven element of the first planetary unit can be connected to drive a second element of the rear planetary unit, which second element can be conditioned to provide reaction for that unit. A reverse drive planetary unit is also included.

In that transmission provision is made for locking an element of the first unit against rotation so that the drive through said unit can be at a reduction ratio. Two of the elements of this unit can also be coupled together so that the entire unit rotates in unison for direct drive therethrough. In the second unit a brake can be applied to one element so that the drive therethrough is at a reduction ratio, or this reaction element can be coupled to the driving element of the first planetary unit so that the entire second unit rotates substantially in unison for direct drive therethrough.

The hydraulic control system associated with this mechanism functions in such a way that the mechanism can have its condition automatically changed to provide first, second, third, and fourth speed ratios. Another range of operation provides first, second, and third speed ratios with advance to fourth speed taking place only above a predetermined vehicle speed. Provision is also made for compelling the transmission to be shifted from a higher speed ratio to a lower speed ratio by actuation of the throttle controlling the supply of fuel to the engine. Ordinarily when such a forced third to second downshift in ratios has been accomplished, transition from the lower ratio to the higher ratio will take place only at a lower vehicle speed than would normally occur for any throttle opening less than full.

An object of the present invention is to provide a shift valve train so influenced by pressure which varies with throttle opening and pressure which varies with vehicle speed as to have a range of normal up-shifting which varies with throttle opening and vehicle speed.

Another object of the invention is to provide a valve train as just described in which provision is made for compelling the valve train to move from a higher ratio establishing position to a lower ratio establishing position under the control of the engine throttle, with the train functioning in such fashion that after the forced shift has been made, advance from the lower ratio to higher ratio will be made in normal fashion.

A further object of the invention is to provide an element of the shift valve train with controls therefor of such nature that this element can be compelled to move the shift valve from a higher speed ratio position to a lower speed ratio position, after which the element so actuated is automatically deactivated.

In carrying out the foregoing and other objects of the invention a shift valve train is made up of a shift valve which determines the ratio establishing conditions in a planetary gear unit, a governor plug which is subject to fluid of varying pressure, which pressure increases with vehicle speed, and a so-called detent plug which is normally stationary but which has fluid pressure varying with throttle opening applied to one end thereof. This latter pressure is also normally applied to the shift valve so that movement of this valve takes place under the joint control of the governor pressure and the throttle valve pressure. The so-called detent plug can have pressure determined by the pump supplied to one end thereof by throttle action to move the entire valve train from its higher ratio establishing position to its lower ratio establishing position. When such movement occurs throttle valve pressure which had been removed from the other end of the plug is reestablished thereon as well as on the shift valve so that further movement of the shift valve to establish the higher position takes place in a normal fashion dependent on throttle valve position and vehicle speed.

The features and objects of the invention will be apparent by reference to the following detailed description of the accompanying drawings, wherein.

Figure 1:
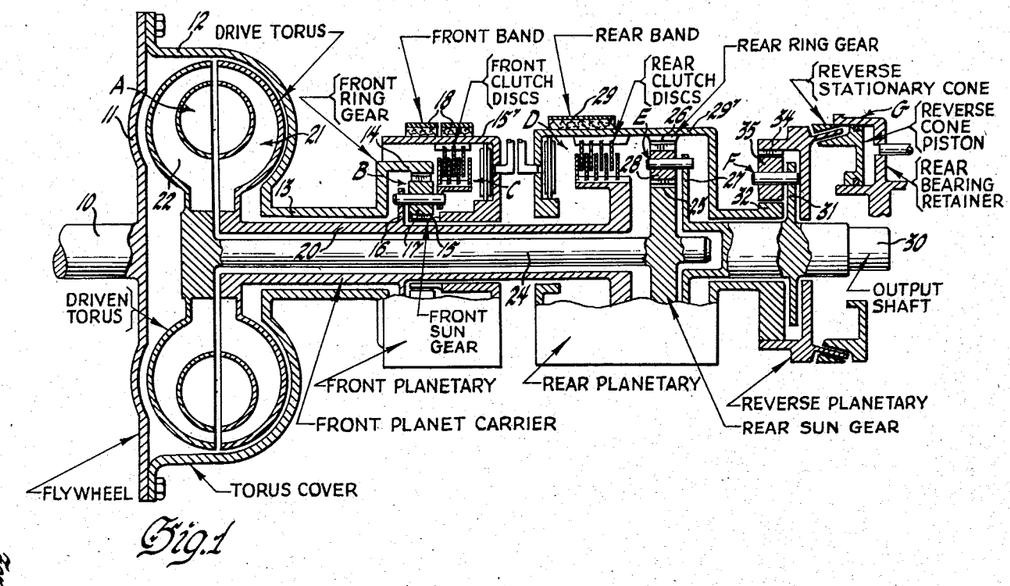
Fig. 1 is a schematic illustration of the mechanism employed in the transmission, and Figs. 2 to 4 constitute a circulation and control diagram of the hydraulic mechanism employed with the transmission of Fig. 1.

Referring to the schematic illustration of the mechanism of Fig. 1, 10 indicates the input of the device and may be the crank shaft of an internal combustion engine or other source of motive power. The input 10 is connected by disk 11 to cover member 12 of a fluid coupling indicated generally at A. The cover 12 is continued to drive the ring gear 14 of a front planetary unit B, which unit also includes a sun gear 15 and a planet carrier 16 having planet pinions 17 meshing both with the ring gear 14 and the sun gear 15. The sun gear 15 can be braked against rotation by a brake band 18 operated in a manner to be described later or can be locked for rotation with the planet carrier 16 by means of a clutch C, the elements of which will be described in connection with the control diagram of the apparatus.

The planet carrier 16 is connected to a sleeve shaft 20, one end of which is connected to drive the pump 21 of the fluid coupling A. The other end of the shaft 20 is connected to a clutch indicated generally at D, whereby this shaft can be caused to rotate with the ring gear of the rear planetary unit E. The turbine 22 of the fluid coupling is connected to another intermediate shaft 24, one end of which is secured to, or which has integrally formed therewith, the sun gear 25 of the rear planetary unit E. This unit also includes the ring gear 26 and a planet carrier 27 having pinions 28 meshing both with sun gear 25 and ring gear 26. The ring gear 26, in addition to being connectible to rotate with shaft 20, can be braked against rotation by the brake band 29, the mechanism for the operation of which will be described in detail hereinafter.

The planet carrier 27 is connected to drive the output shaft 30 which also has secured thereto the planet carrier 31 of the reverse planetary unit indicated at F. The unit F comprises sun gear 32 connected to the ring gear 26 of unit E, a ring gear 34 and planet pinions 35 meshing both with the sun gear 32 and ring gear 34. The ring gear 34 can be braked against rotation by means of the brake indicated generally at G.

This transmission operates to provide four forward speeds or gear ratios, and reverse. For the lowest speed ratio the brake bands 18 and 29 are applied to lock the sun gear 15 and the ring gear 26, respectively, against rotation. Clutches C and D and the reverse brake G are released. Under these conditions drive by the input member 10 is communicated through the cover 12 to the ring gear 14 which, due to the reaction afforded by sun gear 15, drives the carrier 16 in the same direction but at reduced speed. Rotation of carrier 16 causes rotation of pump 21 of the fluid coupling A, which in turn causes rotation of the turbine 22. Rotation of the latter is imparted to the sun gear 25 of the rear unit which, due to the reaction afforded by ring gear 26, drives the carrier 27 at a reduced rate of speed. Rotation of the carrier 27 is communicated to the output shaft 30. During this speed ratio and all other forward speed ratios the carrier 31 of the reverse unit F rotates with the output shaft and serves to drive the ring gear 34 which is free to rotate. With both gear units B and E in reduction drive, the lowest forward speed ratio or highest forward gear ratio is obtained.

For second speed ratio the brake band 18 is released and the clutch C engaged, while the condition of the rear unit E is unchanged. Engagement of clutch C causes the carrier 16 to be locked to the sun gear 15, with the result that the front planetary unit B rotates as a unit or affords direct drive. Such drive is communicated through the coupling A to the sun gear 25 of unit E, driving the output shaft through the carrier 27 at a reduction ratio depending on the ratio of the gear unit E only.

For third speed ratio the front brake band 18 is again applied while clutch C is released to lock the sun gear 15 against rotation and condition the front unit B for reduction drive. At the same time the rear brake band 29 is released and clutch D engaged, which causes the ring gear 26 of unit E to rotate at substantially the same speed as the sun gear 25 which is driven by the coupling A at the reduction ratio afforded by the front unit B. This split torque path to the two driving elements of the rear unit E causes that unit to rotate substantially as a locked-up planetary unit and consequently drives the output shaft 30 at a reduction ratio dependent solely on the ratio of the front unit B.

For fourth speed the front unit B is again conditioned for direct drive by release of the brake band 18 and application of clutch C, while the rear unit E remains conditioned for direct drive therethrough.

In this ratio both planetary units are in effect locked up so that the drive from the input shaft 10 to the output shaft 30 is substantially direct drive, varying therefrom only by the inherent slipping of the fluid coupling A.

For reverse drive the front unit B is conditioned for reduction drive, i.e., the brake band 18 is applied with clutch C released. The rear unit E is conditioned by having both the brake band 29 and the clutch D released. The reverse unit is conditioned by engagement of the reverse brake G which locks ring gear 34 against rotation. Under these circumstances drive from the input shaft 10 is through the front unit B at reduction ratio which causes rotation of sun gear 25 at a reduced speed through the intermediary fluid coupling A. With a load on the output shaft, and consequently on the planet carrier 27, this carrier offers an initial reaction so that rotation of sun gear 25 in a forward direction causes rotation of ring gear 26 in the reverse direction. This reverse rotation is imparted to the sun gear 32 which, due to the reaction afforded by stationary ring gear 34, drives the carrier 31 in the reverse direction, imparting such rotation to the output shaft 30. Such reverse rotation of the output shaft is communicated to the carrier 27 so that the two units E and F act as a compound planetary for reverse drive.

As set forth in the applications of Walter B. Herndon, before identified, the transmission has controls therefor of such character as to provide three forward driving ranges and reverse. The first range, or Driving Range 4, when selected permits operation of the mechanism to cause the same to automatically advance from first speed ratio through second and third speed ratios to fourth speed ratio. The second range, or Driving Range 3, so conditions the control mechanism of the transmission that under normal driving conditions this transmission will automatically advance from first ratio through second to third ratio and will not continue to fourth ratio unless a predetermined high vehicle speed is attained. In the third, or Low Range, the mechanism is conditioned so that under normal driving the transmission will not automatically advance beyond second speed ratio, but should a predetermined vehicle speed be exceeded, additional shifts will be made to prevent excessive engine speed. The Reverse Range provides a single reduction ratio.

Figure 2:
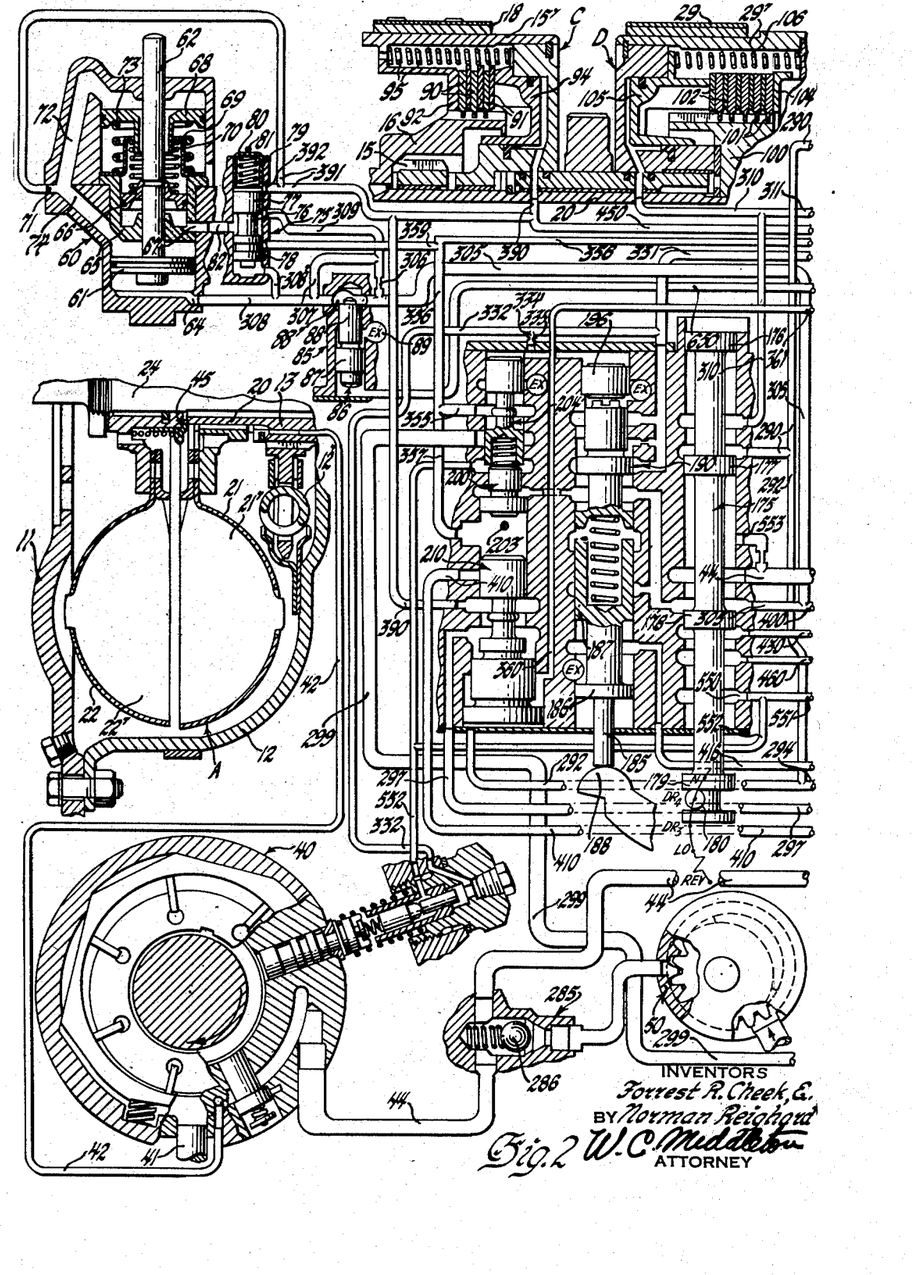
Figure 4:
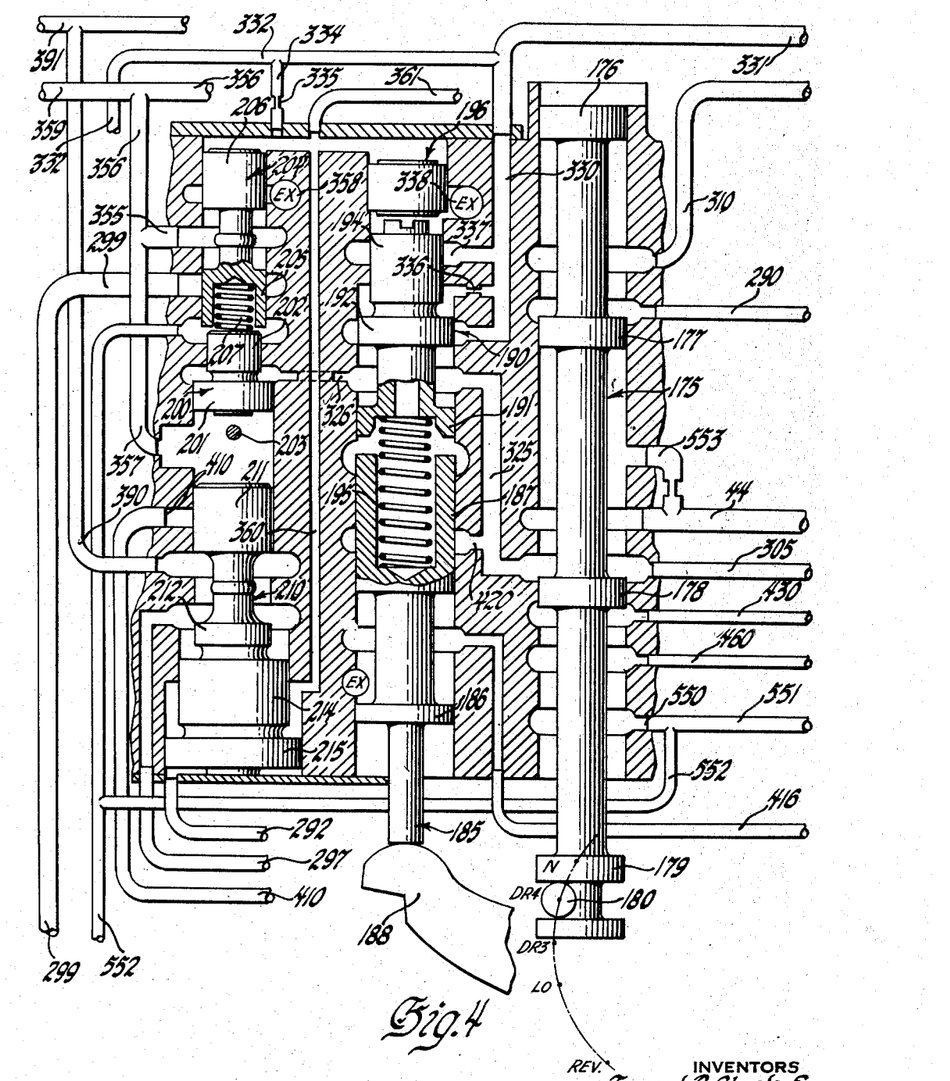
Figure 5:
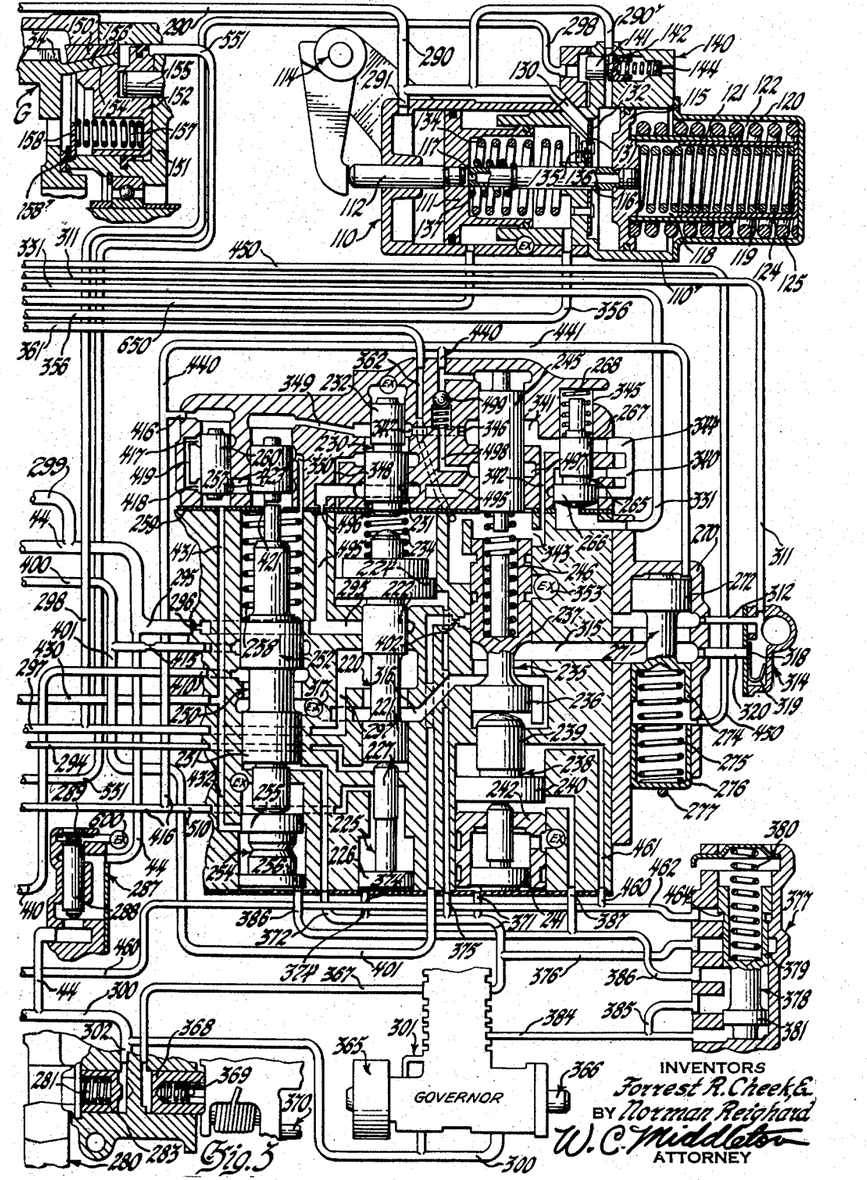

The control apparatus and the hydraulic actuation thereof will be clearly understood from the following description of the circulation and control diagram shown in Figs. 2 and 3. Inasmuch as most of the elements involved in this arrangement have been described in detail in the Herndon applications before mentioned in detail, description thereof in the present application will not be made.

In the figures of drawings comprising the circulation and control diagram the fluid coupling A is shown in enlargement with the pump 21 being made up of a shell having a plurality of flat plates 21' positioned therein. The turbine 22 is constructed in the same fashion and likewise has a plurality of blades 22'. The cover 12 for the fluid coupling is shown as being connected through antivibration device 12' to the sleeve shaft 13 which is connected to drive the ring gear 14 (Fig. 1) of the front planetary unit B. This sleeve shaft 13 also serves to drive a front pump 40 of the variable capacity type which has been described in the copending applications before identified. The pump 40 draws oil from a sump (not shown) through the suction line 41 and delivers the same to the main pump supply line 44. A secondary supply line 42 extends from the pump to the fluid coupling A to provide the same with liquid. The coupling has a check valve indicated generally at 45 which operates to release oil under pressure for lubricating purposes when a predetermined pressure is attained within the coupling. The manner in which oil under pump pressure is supplied to the control mechanism and the relation of the front pump 40 to a rear pump 50 will be described later.

The brake band 18, which can be wrapped around the drum 15' (connected to sun gear 15) of Fig. 1, is under the control of a servo indicated generally at 60. This servo comprises a body within which is slidably mounted a piston 61 attached to a plunger 62 which, when extended from the casing, serves to apply a force to wrap the double wrap band 18 about the drum 15'. A port 64 communicates with the bore of the body below the piston 61. Intermediate the ends of the body is located a partition member 65 apertured for the passage of the plunger 62. The partition member serves as a cylinder for piston 66 secured to the plunger 62. A port 67 communicates with the interior of the partition member 65 below the piston 66. The body is provided with a further bore within which is slidably mounted a piston 68, the upper part of which encompasses the plunger 62 for close sliding movement relative thereto. The upper end of a cup-shaped member 69 serves as a seat for one end of spring 70, the other end of which bears against the piston 66. The member 69 also provides a seat for spring 73, the upper end of which bears against the piston 68. The body is provided with a port 71 in communication with a passage 72 leading to the bore above piston 68 and a further passage 74 leading to the bore above piston 61.

Mounted adjacent to the servo 60 is an overrun control valve indicated generally at 75 and comprising a valve body having a bore in which is slidably mounted valve member 76 which has an upper land 77 and a divided lower land 78. The valve member 76 is normally biased in a downward direction by spring 79 held in place by cup-shaped spring retainer 80 and pin 81. The bore of valve 75 is connected by line 82 to the port 67 of the servo 60. The valve 75 is also provided with a number of ports to which oil supply lines, hereinafter identified, are connected.

Also associated with the servo 60 is a fourth to third timing valve indicated generally at 85 and comprising a valve body provided with bores of different diameters in which is slidably mounted a valve member 86 having a large land 87 and a smaller land 88. This valve body is also provided with a plurality of ports to which are connected various lines, which will be identified later, and also a port connected to an exhaust passage 89.

The front clutch C is also illustrated in greater detail. The sun gear 15 is shown as being connected to the drum 15' about which the band 18 can be wrapped to lock the sun gear against rotation. Illustration of a pinion 17 in mesh with the sun gear 15 has been omitted. A part of the carrier 16 is shown as being splined to receive clutch plates 90 which cooperate with clutch plates 91 externally splined to engage internal splines in the drum 15'. This drum has a backing part 92 against which the plates can be pressed by a hydraulically actuated piston 94, normally biased to the release position by spring 95. The piston 94 as shown is slidably mounted in a cylinder formed by an extension of the support for the sun gear 15.

An enlargement of rear clutch D is also illustrated. It will be seen that a plate carrier 100 is splined to the sleeve shaft 20 and has external splines engaging clutch plates 101. Cooperating plates 102 are splined to the interior of the drum 29' fastened to the ring gear 26 of the rear unit. The brake band 29 can be wrapped about this drum to hold the ring gear 26 against rotation. The plates 101 and 102 can be forced together and against a backing member 104 by hydraulically actuated piston 105 mounted in a cylinder attached to the drum 29'. The plates are normally biased to the released position by spring 106.

The band 29 for the rear unit is under the control of a servo indicated generally at 110, one part of such servo having a bore in which is slidably mounted a piston 111 to which is attached a plunger 112 extending through the body of the servo to engage band operating mechanism indicated generally at 114. Inasmuch as servos of this type and that previously described at 60 are well known, the connection between the respective plungers and the bands have not been shown. A second part 110' of the servo has a neck portion fitting within the body 110, and the part 110' forms a cylinder in which is slidably mounted a piston 115 connected to a hollow rod 116 extending through the end wall of the member 110' into contact with the inner surface of the piston 111. A cross passage 117 in the end of rod 116 permits liquid acting on the inner surface of the piston 111 to continue through the rod 116 into a chamber 118 at one end of the piston 115. Nested cup-shaped members 119 and 120 and a cylindrical member 121 cooperate to form the chamber 118 and a chamber 122 within which are located springs 124 and 125. A passage 130 is partially closed by a reed valve 131 having an orifice 132 therein. This reed valve is normally in the position shown but can be moved to the right to permit freer flow through passage 130 by the force of the liquid itself or by liquid within the servo acting on a small disk 135 connected to button 136 secured to the reed valve. The disk 135 and button 136 are slidable in the partition formed by the end of member 110'. Spring 134 acts during initial movement of piston 111 outwardly. A light spring 137 fastened to the member 116 bears against the piston 111 to separate these members under certain conditions.

Attached to the composite servo is an exhaust valve indicated generally at 140 and comprising a body having a bore within which is slidable a valve member 141 having peripheral groove 142 intermediate its ends. This valve, in the absence of fluid pressure, is biased to the position shown by spring 144. Various ports in the servo and the exhaust valve housing are connected to oil lines which will be described in the operation of the entire system.

The reverse brake shown at G comprises in part a conical member 150 secured to the casing of the transmission to which is also secured a member 151 cooperating with the casing to form a cylinder in which is slidably mounted piston 152 having a conical surface 154 of the same angularity as the part 150. Piston 152 is held against rotation by dowels 155 secured to the stationary member 151. The ring gear 34 of reverse planetary unit F has a cone-shaped extension 156 positioned between the formations 150 and 154. When the piston 152 is moved to the left under hydraulic pressure the cone extension 156 is gripped between the parts 150 and 154, thereby to hold the ring gear 34 against rotation. The piston 152 is normally biased to the release position by spring 157, one end of which engages the piston 152 and the other end of which is retained by ring 158 and snap ring 158' fitting in a groove in member 151.

The control valves for the mechanism are mounted in a valve body which may be made of several parts. One part of the valve body has a bore in which is slidably mounted the main control or manual valve 175 which is provided with spaced lands 176, 177 and 178. One end of the valve is provided with a fork indicated at 179, receiving a pin 180 which can be actuated by a manual lever preferably located on the steering column under the steering wheel of the vehicle in which the transmission is mounted. Manipulation of such lever, which is not shown, will cause the manual valve to assume any one of five positions, the approximate location of which with reference to the center of the pin 180 are shown in the drawings. These positions are designated N for Neutral, DR4 for Driving Range 4, DR3 for Driving Range 3, LO for Low and REV for Reverse. The bore in which the manual valve is slidably mounted is provided with a number of grooves or ports which are connected to various oil lines and passages which will be identified in the course of the description of the operation of the mechanism.

Adjacent to the manual valve is a bore in the valve body in which is mounted for sliding motion a two-part throttle valve, one part of which comprises a pusher 185 having spaced lands 186 and 187. The end of the pusher extends beyond the valve body to be engaged by a member 188 which is actuated by movement of the accelerator pedal or throttle of the vehicle. The other part of the throttle valve comprises a valve member 190 having spaced lands 191, 192 and 194. A spring 195 is interposed between the pusher 185 and the valve 190. A plug 196 is located in the end of the bore in which the valve 190 is slidable. This plug is for the purpose of offering a resistance to movement of the throttle beyond a predetermined throttle position for a forced downshift and is of the type commonly known as a detent plug. The bore for the throttle valve is provided with various ports connected to oil lines or passages which will be described later.

This part of the valve body is also provided with a bore of stepped diameters in which is mounted a two-part compensator valve comprising a member 200 having a large land 201 and a smaller land 202. The other part of the compensator valve comprises a member 204 having spaced lands 205 and 206. A spring 207 is interposed between these parts 200 and 204. Again various ports in the bore are connected to oil lines or passages to be described later.

In line with the bore receiving the compensator valve structure is another stepped bore having a double transition valve 210 slidably mounted therein. This valve 210 has lands 211 and 212 of the same diameter and larger lands 214 and 215. The purpose of this valve in conjunction with the oil lines leading to the bore thereof will be apparent later.

Another part of the valve body has shift valves therein. This part of the body is provided with a stepped bore in which is mounted a first to second shift valve train comprising in part the first to second shift valve 220 having lands 221, 222 and 224. Another member of the train comprises a governor plug 225 having large end land 226 and a stem portion 227. The end of this stem portion bears against one end of land 221. The final member of the train comprises the regulator plug 230 having lands 231 and 232. A spring 234 of predetermined strength is interposed between the shift valve 220 and the regulator plug 230. The connections to various ports in the bore of this valve train will be described in sequence in the operation of the mechanism.

The valve body is also provided with a stepped bore for the second to third shift valve train. This train has as one element thereof the second to third shift valve 235 having lands 236 and 237. At one end of the valve 235 is an auxiliary valve or plug 238 having lands 239 and 240 of different diameters. At the end of this valve or plug 238 is a governor plug 241, slidably mounted in an aperture liner 242. At the other end of the valve train is a third to second detent plug 245 of a single diameter. A spring 246 is interposed between the valve 235 and the plug 245.

The valve body is provided with a further stepped bore in which is mounted the third to fourth shift valve train. One element of this train comprises the third to fourth shift valve 250 having lands 251 and 252. At one end of the valve 250 is a governor plug 254 having lands 255 and 256. At the other end of the shift valve 250 is a regulator plug 257 of a single diameter. A spring 258 of predetermined strength surrounds a part of the stem of the valve 250, being interposed between one end of the land 252 and a partition member 259.

A fourth to third shuttle valve 260 is slidably mounted in a bore in a part of the body as shown.

In parallel relation to the third to second detent plug 245 is a regulator valve 265 having a large land 266 and a smaller land 267. Spring 268 is positioned between one end of the land 267 and a part of the valve body.

Attached to the valve body is a valve casing 270 having a bore in which is slidably mounted a third to second timing valve 271 which has lands 272 and 274 of the same diameters. A spring 275 applies compression to the member 271 to bias it in one direction, the spring being retained by a cup-shaped member 276 and pin 277.

Other valves and mechanical parts heretofore not identified by reference characters will be described either briefly or in detail hereinafter.

Operation

When the engine of the vehicle is not in operation all gear unit servos are exhausted of liquid, but the fluid coupling A may retain some liquid therein from previous operation. Under these conditions the rear servo, which applies the brake band 29 to the drum 29', will be engaged since this servo is of the spring engaged oil released type. In the absence of oil in the rear servo, made up of the parts 110 and 110', the two main apply springs 124 and 125 acting on the piston 115 causes this piston and the rod 116 to force the piston 111 and the plunger 112 outwardly to act on the linkage 114 which applies the band snugly to the drum. At the same time a parking pawl indicated generally at 280 can be spring applied by spring 281 to cause it to engage teeth extending outwardly from the ring gear 34 of the reverse planetary unit F. Such engagement of the pawl 280 with these teeth (not shown) locks the ring gear 34 of reverse unit F against rotation with the end result that, in conjunction with the ring gear 26 of rear unit E being locked against rotation, torque cannot be transmitted through the transmission in either direction.

Neutral

When it is desired to start the engine the manual valve 175 is moved to the Neutral or N position which, due to the safeguards usually employed, is necessary to permit the starting motor for the engine to be energized. When the engine is started torque is immediately communicated to the input shaft 10 and by it to the coupling cover 12 and connection 13 to the ring gear 14 of the front unit B. Since the band 18 is released relative to the drum 15' attached to sun gear 15, this sun gear is free to rotate and offers no reaction. Consequently, the unit B does not transmit torque to the pump 21 of the coupling A. However, rotation of the connection 13 drives the front pump 40 which immediately supplies a volume of oil in accordance with the position of the slide therein. With the pump 40 in operation, oil is drawn from the sump and supplied through the line 42 to fill the coupling A. Oil is also delivered through the main supply line 44 to other parts of the system as follows. In its passage from the pump the oil first acts on check valve 285, seating the ball 286 to prevent escape of oil to the rear pump 50. The oil continues through the line 44 to the line exhaust valve 287, raising the valve member 288 against spring 289 and opening the passage at the bottom of the member 288 for the continued flow of oil through the line 44. This line extends to the bore of the manual valve 175, entering this bore between the lands 177 and 178. In Neutral position the land 177 uncovers a port connected to line 290 which extends to the rear servo 110. A branch line 291 communicates with the interior of the servo to the left of the piston 111, acting to force this piston to the right, compressing springs 134 and 137. Simultaneously, oil continuing through the line 290 passes through the passage 130 with sufficient pressure to flex the reed valve 131 and to enter the part of the servo to the left of piston 115. Piston 115 is thereby also moved to the right, compressing springs 124 and 125. The action of the oil on the two pistons 111 and 115 retracts the plunger 112 so that brake band 29, previously spring applied, is now released. The other elements controlling the apparatus, such as the front band 18, the front clutch C, the rear clutch D, and the reverse brake G, are released so that in the absence of reaction in the gear units drive through the transmission will not be completed. At the same time oil continues through branch line 292 from line 290 to the double transition valve 210, moving this valve against the stop pin 203. A branch line 294 from line 292 continues into the shift valve body to act on the end of land 221, moving the shift valve 220 to the full extent permitted by the regulator plug 230 and compressing the spring 234. When the first to second shift valve 220 is moved to the upshift or open position, oil under line pressure passing through the branch line 295 from line 44 enters the valve body and passes through an orifice 296 to enter the space between lands 222 and 221. The passage 295 is therefore in communication with another passage or line 297 in the valve body and extending to the bore of the double transition valve, at which location further progress is arrested by the land 212 which is now filling the bore of the valve. However, oil in a branch line 298 from line 297 extends to the rear servo exhaust valve 140, moving the member 141 to the right against spring 144 and closing this exhaust valve. A branch channel 495, having restriction 496 therein, extends from channel 295 in the shift valve body to a groove 497 in the bore of the third to second detent plug 245, from which groove 497 a channel 498 extends to a ball check valve 499 which arrests further progress of the oil. Oil in branch line 299 from main line 44 continues to the compensator valve 204, where further progress is arrested by the land 205 of this valve. Oil is also supplied by branch line 300 from main line 44 to the governor 301, but since the vehicle is stationary the governor is inactive at this time. A branch line 302 from line 300 supplies oil under pump pressure to the piston 283 associated with the parking pawl 280 to move this piston against spring 281 to block the pawl from engagement with external teeth of the reverse planetary unit ring gear 34, should the manual valve be moved to reverse position.

In Neutral, with the engine running, oil supplied other than to the parking pawl just mentioned and to the rear servo to release the rear band 29 has no effect on the operation of the mechanism.

*Drive Range 4—Engine idling*

The manual valve 175 can be moved to any of the driving ranges, including Reverse, but let it be assumed that the first operation is that which takes place in Driving Range 4. The manual valve for this range will be positioned as shown in the drawing with the immediate result that oil entering the bore of the manual valve between lands 177 and 178 can pass therefrom through the line 305 to a port in the top of the fourth to third timing valve 85. Valve member 86 of this valve should be in its downmost position, but in the event such is not the case it will be forced into this position immediately in the following manner. Assuming that the land 88 blocks the port connected to the line 305, oil may still continue through the restriction 306 in line 309 to the shunt line 307 and thence into line 308 which communicates with the port 64 of the front servo 60. Oil in the line 308 can enter the top of the valve body 85 into a groove 88' extending partially around the bore surrounding land 88 so that it can enter above this land and exert pressure to force the valve 86 downwardly. When such occurs, unrestricted flow of oil from line 305 to line 308 will occur and this oil will enter the front servo to force piston 61 upwardly. Such action wraps the front band 18 about the drum 15' to prevent rotation of this drum so that the sun gear 15 can provide reaction for the front gear unit B. Oil may also pass through the line 309 to the bore of the overrun control valve 75, and since the valve 76 in this bore has been forced upwardly against spring 79 by oil in line 308' from line 308, the oil from line 309 continues through line 82 into the servo 60 below piston 66. The engagement of the front band or brake conditions the front unit for the transmission of torque, and causes drive of the carrier 16 of front unit B and pump 21 of coupling A at a reduced speed relative to input speed.

When the manual valve is moved to the DR4 position the line 290, previously supplied with oil from the bore of the manual valve, is now blocked from such supply by the land 177, with the result that line 290 and those in communication therewith are now connected through the bore of the manual valve 175, between lands 176 and 177, with the line 310 which extends to the piston 105 of the rear clutch D. A branch line 311 of line 310, however, extends to exhaust at this time by way of a line 312 connected with the body 314 of a hairpin valve, through the bore of the third to second timing valve 271, a channel 315 in the valve body which leads to the space between lands 236 and 237 of the second to third shift valve 235 and thence through a passage 316 to exhaust at a port 317, which is also marked EX. Some of the oil from line 311 may also pass through an orifice 318 in the hairpin valve 319 into the channel 320 which is parallel to the channel 312. This connection to exhaust exhausts not only the line 290 but also exhausts line 292 extending to the end of the double transition valve 210 and line 294 which had caused the first to second shift valve to be moved to its uppermost position. Release of the oil pressure on the land 221 of this shift valve causes the land 222 thereof to block the supply passage line 295 and to connect the line 297 extending to the double transition valve and line 298 extending to the rear servo exhaust valve 140 to exhaust at the port 317. When the rear servo exhaust valve 140 is thus relieved of pressure, the spring 144 returns the valve 141 to the position shown, permitting oil in the space to the left of piston 115 to be exhausted through the branch line 290' to the line 290 more rapidly than it could be exhausted through the orifice 132. Such exhaust of both parts of the rear servo permits the springs 124 and 125 to extend the rod 112 to wrap band 29 about the drum 29'. This action locks the ring gear 26 of rear planetary unit E against rotation and establishes a drive condition in the rear unit if torque is transmitted to the unit through the fluid coupling A. While the engine is idling, however, the load imposed on the turbine 22 of the fluid coupling A through the rear planetary unit E from the output shaft 30 is such that at low engine speed the turbine will not be driven by the pump which is being driven at reduced speed through front gear unit B. Therefore torque sufficient to move the vehicle is not transmitted through the transmission while the engine is idling.

With the manual valve positioned as just described and with the engine idling, oil passes from the bore of the manual valve through the passage 325 to the bore of the throttle valve between lands 191 and 192 and thence through passage 326 to the bore of the compensator valve to act on land 201 and force the part 200 against the stop pin 203. Land 192 of the throttle valve prevents oil from continuing into the passage 330 until the throttle is opened beyond the idling or closed throttle position.

*First speed ratio*

With the transmission conditioned for first speed operation, i.e., with both the front and rear brake bands applied, the motion of the vehicle may be started by opening the throttle to accelerate the engine sufficiently to drive the pump 21 of coupling A at a speed which will compel rotation of the turbine 22 thereof. When the turbine 22 rotates it drives the intermediate shaft 24 and sun gear 25 in the manner previously described, with the result that the output shaft 30 is rotated at the lowest forward speed ratio or highest forward gear ratio.

However, with opening of the throttle the member 188 acts on the pusher member 185, moving it upwardly, as viewed in the drawing, to compress the spring 195 and cause this spring to move the throttle valve member 190 also upwardly. The first result of such movement is that land 192 uncovers the port connected to the passage 330 so that oil under pump pressure from passage 325 can continue through the passage 330 to the line 331, to be distributed to various parts of the apparatus. Line 331 extends to the throttle valve pressure regulator valve 265 in the shift valve body, acting on the lower surface of land 266 to raise the valve 265 against the resistance of spring 268. Oil is also supplied through the branch 332 from line 331 to the regulator valve mechanism of the pump 40 to vary the output of this pump. A further branch line 334 from line 332 supplies oil through restriction 335 both to the detent plug 196 and to the end of land 206 of the compensator valve 204. It will be understood that the throttle valve 190 acts to regulate pressure in the line 331 in accordance with throttle opening. As the pressure in passage 330 rises, due to the oil being delivered therefrom having its progress arrested at various parts in the circuit, this increased pressure passes through a restriction 336 into the bore of the throttle valve to act on the upper surface of land 192 to force the valve 190 downwardly against the spring 195. When this pressure rises sufficiently, it will move the valve 190 downwardly until the passage 337 is opened by land 194 and oil can drain therefrom to the exhaust port 338. This metering action is well known and causes the development of a varying pressure which increases with throttle opening.

The oil delivered by line 331 to the lower surface of land 266 of the regulator valve 265, as before mentioned, causes this valve to move upwardly and it in turn functions as a metering valve, with the result that when the valve is moved upwardly against spring 268, oil from line 331 can enter the passage 340 which continues around the land 267 to a groove 341 surrounding the detent plug 245. A branch passage 342 extends downwardly into communication with the bore of the second to third shift valve 235 between the end of this valve and the detent plug 245. As the pressure in the passage 340 rises, it is reflected in the passage 344 which extends to the upper surface of land 266 and can act thereon in aid of spring 268. Consequently, when the pressure in passage 340 rises above a predetermined value, the valve 265 will move downwardly, opening the passage 340 to exhaust around spring 268 and out of the opening in the casing indicated at 345. This metering action is well known.

From the groove 341 a channel 346 leads to another groove 347 surrounding the first to second regulator plug 230. The oil entering this groove can act on the upper surface of land 231, moving the plug downwardly against spring 234 and opening a port connected to passage 348 extending into the bore of the first to second shift valve 220 to act on the entire upper end thereof in aid of spring 234. From the groove 347 a channel 349 extends to the top of the third to fourth regulator plug 257 so that the modulated throttle valve pressure oil can force this plug downwardly, opening a port connected to channel 350 which extends through the partition member 259 into the bore of the third to fourth shift valve to act on the entire end area thereof.

In the manner just described, oil, the pressure of which is metered by the throttle valve and which hereinafter is called throttle valve pressure, is further metered or modulated by the valve 265 and supplied to each of the three shift valves to aid the springs associated therewith.

When the throttle valve pressure is supplied to the end of land 206 of the compensator valve 204, a further metering action takes place in that this valve is moved downwardly, causing land 205 to open the port connected to line 299 which is supplied with oil under pump pressure, thereby permitting this oil to continue through the bore of the compensator valve into the passage 355 which supplies line 356 and passage 357. The latter passage applies oil to the bottom surface of land 201 and acts to move the part 200 upwardly, so that if the developed pressure from the parts supplied by line 356 rises sufficiently, the part 200 will move the compensator valve 204 upwardly sufficiently for the land 206 to open the exhaust port 358 and thereby reduce the pressure in the compensator lines. It will be noted that the compensator pressure present in the channel 357 is also imposed on the upper end of the double transition valve 210 for a purpose to be described later.

Oil under compensator pressure also goes by line 359 to the overrun control valve 75, at which point it is arrested by the grooved land 78 of valve 76.

In addition to the compensator pressure acting on the end of land 211 of the double transition valve, this valve is also subject to varying pressure in the nature of modulated throttle valve pressure delivered to the inner surface of land 215 by the channel 360 connected to line 361 which extends to a channel 362 in the shift valve body which channel 362 is in communication with the bore of the second to third shift valve train immediately above the second to third shift valve 235. At this point modulated throttle valve pressure is supplied with the end result that this oil likewise is imposed on the double transition valve during certain speed ratios.

As the vehicle begins motion, the governor 301 is driven by the output shaft 30 and acts as a source of two varying oil pressures. Governors of this type have been described in detail in the Herndon applications identified hereinbefore. Briefly, the governor comprises a metering valve 365 subject to centrifugal force to provide a first pressure, hereinafter called G-1 pressure, which increases rapidly as the vehicle speed increases. The governor also includes a second valve indicated generally at 366 also influenced by centrifugal force but to a less degree, with the result that it meters a pressure which rises at a slower rate than the G-1 pressure. The pressure metered by the valve 366 will hereinafter be called G-2 pressure. A supply line 367 for G-1 pressure leads to a reverse inhibitor mechanism comprising a piston 368 biased to the left by spring 369 and associated with mechanism indicated generally at 370 of such nature that when the piston 368 is moved to the right by G-1 pressure the mechanism 370 operates to prevent the manual valve 275 from being moved to its reverse position. This actuation of the mechanism 370 occurs at a relatively low vehicle speed; for example, a speed not in excess of 10 m.p.h. Up to that speed it is possible to move the manual valve to the reverse position without harming the mechanism.

G-1 pressure is also delivered by line 371 directly to the second to third governor plug 241. A branch line 372 from line 371 extends through a channel in the shift valve body to the lower end or surface of the land 251 of the third to fourth shift valve 250. A further branch line 374 delivers G-1 pressure to the first to second governor plug 225. Another branch line 375 communicates with a channel in the shift valve body which extends to the lower surface of land 224 of the first to second shift valve 220. A final branch line 376 delivers oil to a port in the body of a third to fourth over control valve indicated generally at 377, at which port further flow of the oil is arrested by land 379 of the valve 378, which valve is normally biased downwardly by spring 380. Valve 378 also includes a further land 381.

Governor pressure from valve 366 of the governor, or G-2 pressure, is delivered by the line 384 to a port in the body of valve 377 to act on the lower surface of land 381. A parallel continuation line 385 is connected to a port in communication with the bore of the third to fourth overcontrol valve 377 between the lands 379 and 381. From this bore the oil can continue through the line 386 directly to the third to fourth governor plug 254. A branch line 387 from line 386 is connected to a channel in the shift valve body which leads to the lower surface of the land 240 of the second to third auxiliary valve 238.

As the vehicle is accelerated, the drive of the rear pump 50 is also accelerated. This pump, which may be of any well-known type such as a gear pump, as illustrated, is driven by the output shaft 30. As soon as the pressure of the oil delivered by this pump is sufficiently high, it will unseat the ball 286 of the check valve 285 and be added to the oil from the front pump 40 in the main supply line 44.

The transmission will continue operating in first speed ratio until the vehicle attains a speed at which the G-1 pressure from the governor 301, and imposed on the first to second governor plug 225 through the lines 371, 372 and 374, and on the first to second shift valve 220 through the branch line 375 will overcome the counterforce supplied by modulated throttle valve pressure acting on the top surface of land 224 of the shift valve 220 and aided by the spring 234.

*Shift first to second*

When the G-1 pressure is of a value, as just described, which causes the first to second shift valve train to be moved upwardly as viewed in the drawing, oil under pump pressure in branch line 295 from main line 44 continues through the orifice 296 into the bore of the first to second shift valve between the lands 221 and 222 thereof and continues therefrom through the line and channel 297 to the bore of the double transition valve 210. From this bore the oil continues through the line and channel 390 to the piston 94 of the front clutch C. A branch line 391 from line 390 delivers oil to the port 71 of the front servo 60 so that the oil is supplied through the channels 72 and 74 to the pistons 68 and 61 respectively. A further branch line 392 supplies this oil to the top of the land 77 of the overrun control valve 76, forcing this valve downwardly, thereby closing communication with the line 309 and opening the compensator branch line 359 so that oil under compensator pressure continues through the passage 82 into the front servo to act on the bottom surface of piston 66.

The combined action of the front servo and the front clutch is to obtain the engagement of the clutch with the simultaneous release of the front band so that the front gear unit B can be changed from reduction drive to direct drive without the interruption of the transmission of torque therethrough. The front servo therefore acts as an accumulator so that the front clutch is only finally completely engaged when the pressure acting on the tops of pistons 68 and 61 is high enough to move these pistons downwardly to release the front band 18. This downward motion is opposed by pump pressure acting on the bottom surface of the piston 61 and by compensator pressure acting on the bottom surface of piston 66. The opposing force furnished by these two pressures on the two pistons will be of varying character, particularly since the pump pressure varies with throttle valve pressure, but more particularly since the compensator pressure acting on piston 66 also reflects throttle valve pressure.

Engagement of the front clutch C with simultaneous release of the front band 18 locks the sun gear 15 to the carrier 16 so that the front gear unit B rotates as a unit and provides direct drive from the input shaft 10 to the pump 21 of the fluid coupling A. Second speed ratio is thus established and the transmission continues operation in this ratio until the vehicle reaches a higher speed, with consequent higher governor pressures. At the same time the change is accomplished in the front gear unit oil from the line 297 continues by branch line 298 to the rear servo exhaust valve 140, moving the member 141 to close the connection between the servo and the branch line 290'. Compensator pressure oil supplied to the pistons 111 and 115 of the rear servo by line 356 and hollow rod 116 acts on these pistons to increase the force holding rear brake band 29 applied to drum 29'.

Shift second to third

The shift from second to third will occur when the G-1 and G-2 pressures from the governor 301 are high enough in their action on the governor plug 241 and the auxiliary plug valve 238 to overcome the modulated throttle valve pressure on the upper end of the second to third shift valve 235, as aided by spring 246. Parts 241, 238 and 235 of the second to third valve train are moved upwardly, whereupon oil supplied by branch line 400 (connected to line 305) and a further branch line 401 continues into the shift valve body and through orifice 402 to the bore of the second to third shift valve between lands 236 and 237 of the valve 235. The oil can continue from this bore through the passage 315 into the bore of the third to second timing valve in the casing 270 and from this bore through the passage 312 (unrestricted) and 320 (restricted at 318) into the line 311. Line 311 is connected to line 310 which on one hand extends to the piston 105 of the rear clutch D and on the other hand extends into the bore of the manual valve 175 between lands 176 and 177 from which bore the oil continues through line 290 to the passages 291 and 130 in the rear servo to act on the pistons 111 and 115. The purpose of this action is to obtain a release of the rear band 29 with an attendant timed application of the rear clutch D. Movement of shift valve 235 upwardly closes port 343 supplying modulated throttle valve pressure to the shift valve before the port having restriction 402 is opened and connects the space communicating with passage 262 to exhaust at port 353. This drains line 361 and passage 360 extending to double transition valve 210 so that modulated throttle valve pressure is removed from valve 210 before oil under pump pressure reaches valve 210 by way of line 292. Therefore valve 210 is subject only to compensator pressure and pump pressure from line 297 in one direction.

In the shift from second to third a transition must occur not only in the rear planetary unit E but also in the front planetary unit B. For this reason oil from the line 290 continues through the branch 292 to the lower end of the double transition valve 210. When the pressure in the line 290 and those connected thereto rises sufficiently to cause the force of the oil on the lower end of the double transition valve to overcome the effect of compensator pressure on the upper end thereof and pump pressure from line 297, the double transition valve will be moved upwardly against stop 203. This action causes the land 212 to close the bore of the valve between the ports connected to the lines 297 and 390 and connects the port of line 390 with a port connected to line 410 which extends to the bore of the third to fourth shift valve 250 between the lands 251 and 252. This part of the bore at this time is in communication with exhaust at the port 317. When the line 390 and those connected thereto, including lines 391 and 392, are exhausted, the front clutch C is thereby released and the pressure in the front servo opposing the apply pressure, always present in line 308, is also released. The pressure in line 308 therefore acts against the bottom surface of piston 61 to move it upwardly. At this time only the spring 79 opposes the pressure in line 308' so that the valve 76 is moved upwardly, causing oil under pump pressure to continue through the overrun valve 75 and through passage 82 into the front servo to act on piston 66. The rod 62 thereby is moved outwardly again applying the front band 18.

Upon completion of the double transition in the two units, the front unit will again drive in reduction ratio while the rear unit will be conditioned for direct drive. The overall ratio therefore is only that afforded by the front planetary unit B. As a safeguard, oil from the line 292 is also supplied to the branch 294 to the lower end of the first to second shift valve 220 to add to the force applied by the governor plug 225 in assuring that this first to second shift valve will not become adventitiously downshifted.

Shift third to fourth

When the vehicle attains a speed at which the governor pressures are sufficiently high, a shift will be made from third speed ratio to fourth speed ratio. G-1 pressure is supplied through the line 371 and its branch 372 to the lower surface of land 251 of third to fourth shift valve 250. G-2 pressure is also supplied through the line 384, its branch 385 and the continuing line 386 to the third to fourth governor plug 254. The governor pressures so developed are opposed by the spring 258 and by modulated throttle valve pressure acting on the upper end of the valve 250. Governor pressure being sufficiently high, the third to fourth shift valve train is moved upwardly, as viewed in the drawing, whereupon land 252 opens a port connected to line 400 through the restriction 415. This port is placed in communication with a port connected to the line 410 (previously exhausted at port 317) so that the oil now proceeds through line 410 to the bore of the double transition valve 210 and thence through the line 390 to again apply the front clutch C and to release the front band 18 in the manner described in connection with the first to second shift. Completion of this transition in the front unit changes the front unit from reduction drive to direct drive so that the overall ratio of the transmission is substantially 1:1.

Drive in fourth speed ratio will continue until governor pressure is materially reduced; for example, on deceleration of the vehicle or unitl a forced shift from fourth to third is accomplished in either of two ways.

*Detent shift fourth to third*

Should the operator of the vehicle desire increased acceleration and if the vehicle speed is below a predetermined speed, such acceleration can be obtained by movement of the throttle to detent position which is beyond full throttle position. When such movement occurs the pusher element 185 of the throttle valve combination directly contacts the metering element 190 of this combination and forces it along with plug 196 to the full extent of permissible travel. The plug 196 being subject to throttle valve pressure offers a resistance to such movement which is noticeable to the operator and which indicates to the operator that full throttle position has been reached so that the so-called detent downshift will not accidentally be made. Movement of the pusher element as just explained opens a port 420 connected to the channel 325 from the bore of the manual valve 175 and places the bore of the pusher element 185 in communication with a port connected to line 416 which extends to the shift valve body. Oil under pump pressure passes through this line into the top of the bore containing the shuttle valve 260, forcing this shuttle valve downwardly to its full extent. In this manner a port 417 in the bore of this valve is placed in communication with a port 418 by the channel 419. Port 418 being in the form of a groove in the wall of the bore and being connected by a passage 423 to the bore of the regulator plug 257, oil can continue to such bore. In fourth speed the plug 257 will be in its uppermost position as viewed in the drawing so that oil supplied in the manner just described can continue through the bore of the plug 257 and through the opening 421 in partition 259 to enter the bore of the third to fourth shift valve and act on the total end area thereof. This oil being under pump pressure has sufficient force to overcome the governor pressures acting on the other end of the valve train so that if the vehicle is not exceeding a predetermined speed the valve element 250 and the governor plug 254 are restored to the position shown in the drawings which reestablished third speed operation by connecting the line 410 to exhaust at the port 317 and by closing the port connected to the supply line 400. This exhausts the front clutch C and removes the servo release pressure from the front servo so that it automatically reapplies the band 18, locking the sun gear 43 against rotation and establishing reduction drive in the front unit B. Third speed ratio is thus obtained, and the transmission continues operating therein unless a speed is reached resulting from an excessive engine speed. In this event the G–2 pressure from the governor 301 in the line 384 will be high enough to elevate the overcontrol valve 378 against spring 380, placing the port connected with line 376 (G–1 pressure) with the line 386. The latter line therefore at this time has G–1 pressure therein instead of previous G–2 pressure, and this G–1 pressure is introduced into the bore of the third to fourth shift valve train to act on governor plug 254. G–1 pressure now acting on governor plug 254, combined with G–1 pressure acting on the land 251 of the third to fourth shift valve, will be sufficient to overcome the pump pressure acting on the upper end of the shift valve so that the valve train is again shifted to fourth speed position. The purpose of this overcontrol valve is to prevent operation over a continued period at such speed as would require a dangerously high engine speed for its maintenance.

*Manual shift to fourth to third*

A shift from fourth to third can be compelled, if a predetermined vehicle speed has not been reached, by movement of the manual valve from its Drive 4 position, illustrated in the drawing, to the Drive 3 position. Upon this occurrence the land 178 of the manual valve opens a port in the bore thereof connected to the line 430 so that oil supplied to this bore by the main line 44 continues through line 430 into the shift valve body with one branch 431 continuing to the lower end of the shuttle valve 260, forcing it to its uppermost position and placing the bore thereof in communication with the passage 423. This permits oil under pump pressure to act on the entire upper end area of the third to fourth shift valve 250, as previously pointed out in connection with the detent downshaft. Oil in the other branch line 432 from line 430 continues into the bore of the governor plug to act on a differential area of the land 256 of this governor plug 254. Since the oil entering this bore in this fashion acts both on land 256 and 255, greater pressure will be exerted on land 256 since it has a larger diameter than land 255. The result of the application of oil under line pressure, both to the upper end of the shift valve 250 and the governor plug 254, restores third speed ratio until a higher vehicle speed is reached than with the detent downshift, at which time the overcontrol valve 378 compels the valve train to return to the fourth speed position.

*Fourth to third timing valve*

A feature of this transmission comprises the fourth to third timing valve 85 and its operation. This feature is not claimed in the present application, but is the subject matter of claims in the copending application of Kenneth E. Snyder, S.N. 328,725, filed December 30, 1952, for Controls for Servo Mechanisms, now Patent No. 2,768,503.

When the transmission is operating in first and second speed ratios, as before described, the valve member 86 of the timing valve 85 is in the downmost position due to oil pressure on the top of land 88. Consequently, oil can pass freely through the bore of the valve from line 305 into line 308 and thence into the front servo 60. During the transition from second to third speed ratios, the valve remains in this fully open condition until the transition to third speed ratio has been completed. Referring to the rear servo 110, it will be seen that the shell of the front part of this servo has a port therein connected to the line 650 which extends to the bottom of the timing valve 85. When the piston 111 of the rear servo has completed its release stroke, i.e., has moved to the right to the full permissible extent, the piston uncovers the port connected to line 650, permitting oil which had acted on the piston to cause release of the rear band to continue through this line 650 to the bottom of the timing valve 85 to act on the lower end of the member 86, forcing it upwardly. Such upward movement closes the port connected to the line 305 and compels oil continuing to the front servo 60 to proceed through the restriction 306, the by-pass line 307, into the line 308.

The reason for using the timing valve resides in the fact that after the front clutch C has been engaged for a considerable period of time the release thereof requires a longer interval than is required after a short period of engagement of the clutch. Inasmuch as the release of the front clutch must be coordinated with the application of the front band 18, it follows that a delayed release of the clutch must be accompanied by a delayed application of the band; hence, the provision of the restriction 306 through which oil must pass to the front servo for engagement of this band. Prolonged engagement of the front clutch ordinarily occurs only after sustained operation of the transmission in fourth speed ratio. Therefore, when the transmission is downshifted from fourth to third, a longer interval must be permitted for release of the clutch and attendant application of the band.

On the other hand, when the transmission is undergoing the second to third shift during which release of the front clutch is coordinated with application of the front band, delay in the application of this front band is not necessary and in fact is undesirable. The timing valve therefore assures a prompt application of the front band in the second to third shift by being held in its full open position until the second to third shift has been completed. It will be obvious that the third to fourth shift will occur later, and the downshift from fourth to third will be at a timed rate due to the fact that the timing valve member 86 is moved to closed position only after the second to third shift has been completed.

The function of the timing valve 85 is present in each fourth to third shift whether it be of a forced nature such as by detent operation or if the shift occurs in the normal course of operation of the transmission following deceleration of the vehicle.

*Operation in Drive Range 3*

If desired, the transmission may be conditioned to automatically shift through first and second speed ratios to third speed ratio and no further, under normal driving. To this end the manual valve 175 can be moved to the DR3 position either directly from Neutral or at any other time during the operation of the mechanism. If the valve is moved to the DR3 position before the transmission has attained fourth speed ratio, the effect thereof is that just described in connection with the manual fourth to third downshift. The oil pump pressure is supplied through the line 430 to the branches 431 and 432 to establish a bar against an upshift to fourth speed ratio, under normal conditions. The transmission can automatically advance from first through second to third speed ratios, at which point further upshifting will be prevented until a speed is reached at which the overcontrol valve 377 compels such shift. It will be noted that even though the third to fourth regulator plug 257 may be in its downmost position, as illustrated, due to the presence of modulated TV pressure on the upper end thereof and hence is blocking the port connected to the branch 423, the undesired normal third to fourth shift will still be prevented since the initial movement of the valve train to establish fourth speed will move the regulator plug 257 far enough to uncover the port connected to channel 420, whereupon full line pressure will be immediately impressed on the upper end of the third to fourth shift valve 250, which will prevent completion of the third to fourth shift. The valve 250 will be held in the position shown until a predetermined vehicle speed is reached, at which time the overcontrol valve 377 will operate to compel the upshift in the manner previously described.

*Detent shift third to second*

A feature of this transmission, which is the subject matter of the present invention, comprises the operation of the second to third shift valve train during and after a forced downshift from third to second by throttle pressure, or in other words a detent third to second shift. In the normal operation of a transmission of this type a second to third shift can take place at various vehicle speeds depending on throttle position. At full throttle the shift will take place at approximately 35 m.p.h. The mechanism is so calibrated that a detent downshift from third to second can take place at any vehicle speed below approximately 25 m.p.h. In these transmissions, as heretofore constructed, a detent downshift from third to second could compel the transmission to continue operating in second speed ratio to a higher vehicle speed than full throttle shift speed before a second to third upshift was compelled if detent position be maintained. Furthermore, in these transmissions, should the detent downshift be made, followed immediately by a release of the detent plug by movement of the throttle, the upshift to third would take place immediately, regardless of vehicle speed or throttle position.

The third to second valve train of this transmission functions in such manner that, after a third to second detent shift has been made, a second to third upshift will take place automatically under normal operating conditions. Assuming that the transmission is operating in third speed ratio with the manual valve in the Driving Range 3 position, or in fact with the transmission operating in third speed ratio with the manual valve in Driving Range 4 position, a detent shift from third to second by throttle manipulation can be obtained provided the vehicle is operating at a speed below a predetermined maximum. When the throttle is moved beyond full open position, as explained in connection with the detent fourth to third shift, oil from the manual valve bore continues through the line 325, branch 420, to the passage connected to line 416 so that oil continues through the line 416, as previously described. However, since the third to fourth shift valve is in the closed position, the effect on this valve is of no consequence. Oil, however, continues through the line 440 into a channel in the shift valve body and directly into the bore of the second to third valve train above the detent plug 245. The oil thus supplied being at pump pressure can immediately move this valve downwardly, compelling movement of the second to third shift valve 235 also downwardly. The latter movement closes the port connected to the line and passage 401, through the restriction 402, and opens the passage 315 to exhaust at the port 317 through the channel 316. This would normally immediately reestablish second speed operation, but it is desirable that a modified timing be employed. Consequently, at the same time that oil is supplied through the line 440 to the detent plug 245, a branch line 441 from line 440 supplies oil to the top surface of land 272 of the third to second timing valve 271, forcing this valve downwardly against the resistance of spring 275. Land 272 therefore closes the port connected to the passage 312.

Since in establishing second speed ratio after the transmission has been in third speed ratio it is necessary to exhaust the rear clutch D with an accompanying application of the rear band 29 attended by a timed application of the front clutch C with release of front band 18, the action of the third to second timing valve 271 must be considered. With the passage 312 closed, the result is that oil which has applied rear clutch D now is exhausted by way of the line 310, branch 311, to the hairpin valve 319 so that this oil must continue through the restriction 318 of the hairpin valve to the passage 320 and thence through the bore of the third to second timing valve 271 to the channel 315 communicating with channel 316 and to exhaust at the port 317. The restriction 318 in the hairpin valve therefore retards exhaust of the rear clutch, and since the rear servo, which has been released by oil pressure, has this release pressure also exhausted through the line 290 to the bore of the manual valve and thence through line 310 and branch 311 in the same manner as just described, the release of the rear clutch D and the spring application of the rear band 29 by the rear servo will consequently be retarded until the front unit has been properly conditioned.

When oil is supplied through the line 440 to the third to second detent plug, it is also supplied to the ball check valve 499, unseating the same and permitting the oil under pump pressure to continue through channel 498 to the passage 495 having restriction 496 therein and into the supply line 295 which is opened to the passage and line 297 at the bore of the first to second shift valve 220. The line 297 extends to the double transition valve which in third position prevents further travel of the oil but which must be restored to the illustrated position so that oil under pressure can be applied to the front clutch C.

Restoration of the double transition valve to the illustrated position is accomplished as follows. In addition to the line 292 which had supplied oil to move valve 210 upwardly now being exhausted along with the rear clutch D (line 292 being connected to line 290), an impetus to the movement of the valve is afforded by the application of full throttle valve pressure from the second to third shift valve 235 through the channel 342, port 343, the top of the valve 235, channel 362, line 361 and channel 360 to the upper surface of land 215 of the double transition valve 210. Also, compensator pressure, which is at a maximum due to full throttle position, acts on the upper surface of land 211. This cumulative force moves the double transition valve from its upshifted to its illustrated position so that oil supplied to the line 297 through both the restrictions 296 and 496 can continue through the line 390 to the front clutch C to apply the same and also through the line 391 to the front servo 60 to cause it to release the front band 18.

As the pressure being supplied to the piston 94 of the front clutch C increases, with the accumulator action provided by the front servo 60 cooperating therewith, this increased pressure is reflected on the third to second timing valve 271. A branch line 450 from the line 390 extends to the bore of the third to second timing valve and into the chamber receiving the spring 295. This oil therefore can act on the lower end of the hollow land 274 of valve 271 to aid spring 275. When the pressure being applied to the piston 94 of front clutch C has increased sufficiently to be capable of fully engaging this clutch, this pressure acting on the third to second timing valve will restore it to the illustrated position so that the oil being exhausted from the rear clutch D and from the rear servo 110 can be exhausted through the passage 312 at normal rate instead of being compelled to be exhausted through the restriction 318 of the hairpin spring 319. In this fashion the transition from direct drive to reduction in the rear planetary unit E is coordinated with the transition from reduction drive to direct drive in the front unit B.

The manner in which the rear servo reapplies the band 29 is worthy of note at this time. During a closed throttle downshift when the line 290 is opened to exhaust, oil to the left of piston 111 can immediately pass into line 290 through the channel 291. Spring 134, which has been compressed, can move the piston 111 to the left until spring 134 is fully expanded. Such full expansion occurs before piston 111 has reached the limit of its travel to the left. Oil to the left of piston 115 must pass through the restriction 132 into the channel 130 and thence into line 290. The exhaust valve 140 at this time is closed. Consequently, travel of piston 115 to the left is at a slower rate than travel of piston 111. As the piston 115, under the urging of springs 124 and 125, approaches its full travel, rod 116 approaches piston 111. Contact of rod 116 with piston 111 is cushioned by the spring 137. The final movement to the left of both pistons is under the urging of the two main springs 124 and 125, and this final band-apply motion is without shock.

However, when a detent downshift is made, the above action does not take place since, at detent position of the throttle valve, throttle valve pressure is at the maximum and compensator pressure is also at the maximum. Compensator pressure at maximum is introduced through the line 356 into the servo to act on piston 111, to pass through the rod 116, and to act on piston 115. Simultaneously, this oil under compensator pressure acts on disk 135, moving it to the right and, in so moving, forcing button 136 to the right which flexes the reed valve 131 to an extent sufficient to unblock the passage 130. With this passage 130 opened, oil to the left of piston 115 can be quickly exhausted, i.e., at the same rate that oil is exhausted from the left of piston 111. Consequently, the two pistons are moved more or less in unison and at a rapid rate to cause the quick engagement of the rear band 29.

A feature resides in assuring that a second to third shift following a detent third to second shift will be of normal nature. When the third to second detent plug is forced downwardly to cause the second to third shift valve 235 to resume its closed or downshifted position, modulated throttle valve pressure, which at full throttle is pump pressure, is immediately restored to the upper end of the shift valve 235. Referring to the drawing, it will be seen that this modulated throttle valve pressure entering the bore of the valve 235 through the channel 342 is interrupted when the valve 235 is in its uppermost position. This is due to the land 237 closing the port 343 connected to channel 342. When the valve is moved by the detent plug 245 to its closed position, the port 343 connected to the channel 342 is again opened. Modulated throttle valve pressure therefore is restored to this shift valve 235.

By reference to the drawing it will be seen that the third to second detent plug 245 is of uniform diameter with equal end areas. Such uniform diameter results in the following operation. Oil to cause the third to second shift supplied to the top of the plug 245 from the throttle valve is at pump pressure. This causes the plug to move downwardly, forcing the entire valve train in the same direction. When the second to third shift valve 235 opens port 343, modulated throttle valve pressure, which at full throttle is at pump pressure, is applied both to the top end of the valve 235 and the lower end of the plug 245. This plug therefore will have equal oil pressures on the two ends thereof so that the spring 246 can restore the plug 245 to the position shown in the drawing. Upon being restored to this position the plug offers no resistance to normal upshifting of the valve 235 to establish third speed ratio, assuring that once the plug has resumed the illustrated position further automatic shifting of the valve 235 takes place in normal fashion. Consequently, if the throttle be maintained at detent position or at full throttle position, the shift from second to third will occur at the normal vehicle speed for which the apparatus is calibrated; in the example given, 35 m.p.h. If the throttle is released to other than full throttle position, the second to third shift will occur at the normal vehicle speed planned for the particular throttle opening. In other words, this new arrangement assures a normal second to third shift after a detent third to second shift.

*Manual shift third to second*

A shift from third to second can be compelled at any time the vehicle speed has not exceeded a predetermined maximum by movement of the manual valve 175 to the low position. When this movement occurs the land 178 opens a port connected to line 460 so that oil supplied by the main pump line 44 can continue through line 460 to a channel 461 in the shift valve body, which channel communicates with the bore of the second to third auxiliary valve 238 above the land 240. Oil under pump pressure acting on this land can force the auxiliary valve or plug 238 downwardly against the governor pressure acting on the governor plug 241. The areas of these two plugs 238 and 241 are so calibrated that such movement of the plug 238 can take place if the vehicle has not exceeded a speed of, for example, 45 m.p.h., which speed would be reflected in the governor pressure acting on plug 241. When the plug 238 is moved downwardly and assumes the illustrated position, the spring 246 can move the second to third shift valve 235 to its closed position, with the result that second speed condition of the transmission is immediately obtained. It will be noted that the timing afforded by the third to second timing valve 271 is not utilized in the manual third to second shift, but that the normal release of the clutch D with application of the band 29 is coordinated with the application of the clutch C and release of band 18.

Inasmuch as the manual valve 175 can be moved to the low position at any time, certain safeguards are provided. Ordinarily movement of the manual valve to the low position will not cause the transmission to be immediately conditioned for second speed operation unless the vehicle speed is such that the governor pressures reflecting vehicle speed will permit the downshifting. One safeguard is the provision of a branch line 462 extending to the overcontrol valve 378 so that oil under pump pressure can be applied to an area 464 thereof to move this valve upwardly against spring 380. This upward movement of the valve 378 permits G–1 pressure from line 376 to be supplied to the line 386 extending to the third to fourth governor plug 254. This pressure will be high enough to hold the transmission in fourth speed ratio until vehicle speed has dropped below the maximum speed at which the vehicle should be operated in second speed ratio; for example, 45 m.p.h. The G–1 pressure is also supplied to the second to third auxiliary plug 238 through the line 387 from line 386 so that the second to third valve train cannot be downshifted until vehicle speed has been appropriately decreased.

Low range

As before mentioned, the manual valve 175 can be moved to the low position at any time, with attendant downshifting of the transmission if it has been operating in third or fourth speed ranges. If the vehicle, however, is not in motion and the manual valve is moved to the low position, oil will be supplied through the line 460 as previously mentioned, with the result that the transmission will automatically advance from first speed to second speed with engine acceleration. The presence of oil under pump pressure on the upper surface of land 240 of the second to third auxiliary valve or plug 238 will prevent a normal second to third shift and will compel the transmission to operate in second speed ratio, with advanced engine acceleration up to a maximum vehicle speed. When this speed is exceeded, G–1 pressure acting on the second to third shift valve train will overcome the resistance applied to the plug 238 and compel a shift to third speed ratio so that undue engine speed will not be exceeded. A further shift from third to fourth will occur if the maximum third speed operation is exceeded.

Detent shift second to first

With the transmission operating in second speed ratio in any of the ranges thereof, but particularly in Low Range, a forced shift from second to first can be procured by throttle motion through the detent position, as described hereinbefore in conjunction with detent downshifts. Such movement of the throttle causes the oil in line 416 to pass through a branch line 510 into the body of the first to second shift valve train to act on the upper surface of land 226 of the first to second governor plug 225. The pump pressure acting on the upper surface of this land will be sufficient to move the governor plug 225 to its illustrated position provided governor pressure is not at a value reflecting a predetermined vehicle speed. With the governor plug 225 moved to its illustrated position the spring 234 can move the shift valve 220 to closed position, reestablishing first speed operation.

Reverse

To obtain reverse drive through the mechanism the manual lever 175 is moved to the Reverse position. This movement causes the land 178 of the manual valve to uncover a port connected with passage 550 which extends to a line 551 leading to the piston 152 of the reverse brake G. This piston is thereby moved to lock the ring gear 34 against rotation. Simultaneously, line 552 in communication with passage 550 conducts oil to the front pump 40 to so regulate the same as to cause the output pressure thereof to be materially increased as for example, by 100 percent. At the same time land 177 of the manual valve is positioned between the port connected to line 44 and a port connected to a branch channel 553. This permits oil supplied by the main line 44 to enter the bore of the manual valve between lands 177 and 176. The latter land is positioned between the ports connected to the lines 290 and 310. Line 290 therefore receives oil under pump pressure and conducts it to the rear servo 110 to cause release of the band 29. This line 310 which leads to the rear clutch D is exhausted through the now upper end of the manual valve bore so that this clutch is released. Simultaneously with the release of the rear servo by oil flowing in line 290, movement of the double transition valve is also accomplished by oil in line 292 branched from line 290. This conditions the double transition valve so that land 212 closes the bore thereof and prevents oil supplied to the line 297 from continuing to the front clutch C. This oil is available due to the first to second shift valve 220 having been moved to the open position by oil in the line 294 branched from line 292. The front band however is applied by oil in the line 305 in the manner explained in connection with first speed ratio.

With the front band 18 applied, the front clutch C released, the rear clutch D released, and the rear band 29 released while the reverse brake G is applied, the planetary units are conditioned for reverse drive in the manner previously described. The operation of the double transition valve in closing the bore thereof serves as insurance that the front unit B cannot be upshifted to a direct drive condition but will remain in reduction drive.

So long as the vehicle does not attain an excessive speed in Reverse, the manual valve can be moved to cause alternate operation in Reverse and in Low Range for rocking the car in sand, mud, etc.

Normal downshifts

The mechanism operates to provide normal downshifts with the throttle in various positions, as will be evident from the foregoing. Ordinarily when bringing the vehicle to a stop the throttle is closed, in which event throttle valve pressure is not developed and supplied to the various parts of the mechanism. Furthermore, the shift valves are so proportioned as to insure a downshift at a lower vehicle speed than that at which the upshift occured. For example, it will be seen that the land 221 of first to second shift valve 220 is of smaller diameter than the land 222. Consequently, when oil under pressure is present between these two lands the area of land 222 subject to this pressure is greater than the area of land 221 subject to the pressure. This differential area condition results in the oil passing through the bore of the valve between the lands holding the valve in the open position until a considerably lower governor pressure is opposing spring action.

Likewise, the land 237 of the second to third shift valve is of larger diameter than that of land 236 for the same purpose. This is also true of the third to fourth shift valve 250 which has land 252 of larger diameter than land 251.

Exhaust of the system

If the manual valve is moved to Neutral position and the engine stopped, the following will take place. Stopping of the engine stops rotation of pump 40 so that the line pressure in line 44 acting on the lower end of the line exhaust valve 287 drops and this valve is forced downwardly by the spring 289. Such downward movement of the valve opens the line beyond the exhaust valve to exhaust at the port 600, permitting oil throughout the system to be exhausted without return through the front pump. Considering that the manual valve is in Neutral position, it will follow that oil which had been supplied to the front servo for application thereof by line 305 and branches therefrom is now exhausted through the open lower end of the bore of the manual valve body. The line 390 to the front clutch C is exhausted through the following path; bore of the double transition valve 210, line 297, bore of the first to second shift valve 220, passage 316 to the exhaust port 317. Line 310 leading to the rear clutch is exhausted at the open upper end of the manual valve bore (land 176 extending beyond the body in Neutral). The reverse brake G has its supply line 551 connected to exhaust by the passage 550 leading to a port in the manual valve body, the bore having its lower end completely open at this time. Oil pressure to the rear servo which could be supplied by line 290 is exhausted by the following path; bore of the manual valve body, main line 44, to the exhaust valve 287. Application of the rear band 29 by spring pressure is thus assurred so that when the parking pawl engages external teeth in the reverse unit ring gear 34 the transmission can be locked for parking.

It will be understood that the engine can be stopped with the manual valve in any of its positions but that the engine cannot again be started until the manual valve is placed in the Neutral position, thereby preventing adventitious operation of the transmission in other than the desired sequences.

The invention is to be limited only by the following claims.

What is claimed is:

1. In a transmission for an engine driven vehicle, an input shaft, an output shaft, a source of fluid pressure, gearing between said shafts, hydraulically actuated devices for conditioning said gearing to provide a plurality of speed ratio driving connections between said shafts, a shift valve train including as an intermediate element, a shift valve so controlling supply of fluid from said source to said devices that in a first position of said shift valve said devices condition said gearing for a low speed ratio drive and in a second position of said shift valve said devices condition said gearing for a higher speed ratio drive, said shift valve train including terminal plug elements aligned with each end of said shift valve, said elements being slidable in a bore of a valve body, a throttle valve mechanism regulating pressure of fluid from said source in accordance with throttle position, governor valve mechanism regulating pressure of fluid from said source in accordance with the speed of rotation of one of said shafts, said bore being provided with a port in the part thereof in which said shift valve slides, fluid from said throttle valve entering said bore through said port and acting on an area of said shift valve to move said shift valve in one direction, fluid from said governor valve acting to move said shift valve in the other direction, said shift valve normally being moved from said first position to said second position over a predetermined range of opposing throttle valve pressures and governor pressures, said shift valve when in said second position covering said port and blocking the supply of throttle valve pressure to said area thereof, and means controlled by said throttle valve mechanism and operable when said shift valve is in said second position for delivering fluid under pressure from said source to said shift valve train for moving one of said terminal plug elements thereby forcing said shift valve to said first position, completion of movement of said shift valve from said second position to said first position uncovering said port and restoring the supply of throttle valve pressure to said area of said shift valve and reestablishing the relation of throttle valve pressures and governor pressure for normal shifting of said shift valve from said first position to said second position.

2. In a transmission for an engine driven vehicle, an input shaft, an output shaft, a source of fluid pressure, gearing between said shafts, hydraulically actuated devices for conditioning said gearing to provide a plurality of speed ratio driving connections between said shafts, a shift valve train including as an intermediate element a shift valve so controlling supply of fluid from said source to said devices that in a first position of said shift valve said devices condition said gearing for a low speed ratio drive and in a second position of said shift valve said devices condition said gearing for a higher speed ratio drive, said shift valve train including terminal plug elements aligned with each end of said shift valve, said elements being slidable in a bore of a valve body, a throttle valve mechanism regulating pressure of fluid from said source in accordance with throttle position, governor valve mechanism regulating pressure of fluid from said source in accordance with the speed of rotation of one of said shafts, said bore being provided with a port in the part thereof in which said shift valve slides, fluid from said throttle valve entering said bore through said port and acting on an area of said shift valve to move said shift valve in one direction, fluid from said governor valve acting to move said shift valve in the other direction, said shift valve normally being moved from said first position to said second position over a predetermined range of opposing throttle valve pressures and governor pressures, said shift valve when in said second position covering said port and blocking the supply of throttle valve pressure to said area thereof, and means controlled by said throttle valve mechanism and operable when said shift valve is in said second position with said governor pressure below a predetermined maximum for delivering fluid under pressure from said source to said shift valve train for moving one of said terminal plug elements thereby forcing said shift valve to said first position, completion of movement of said shift valve from said second position to said first position moving one of said terminal plug elements thereby restoring the supply of throttle valve pressure to said area of said shift valve and reestablishing the relation of throttle valve pressures and governor pressure for normal shifting of said shift valve from said first position to said second position.

3. In a transmission for an engine driven vehicle, an input shaft, an output shaft, a source of fluid pressure, gearing between said shafts, hydraulically actuated devices for conditioning said gearing to provide a plurality of speed ratio driving connections between said shafts, a shift valve train including as an intermediate element a shift valve so controlling supply of fluid from said source to said devices that in a first position of said shift valve said devices condition said gearing for a low speed ratio drive and in a second position of said shift valve said devices condition said gearing for a higher speed ratio drive, said shift valve train including terminal plug elements aligned with each end of said shift valve, said elements being slidable in a bore of a valve body, a throttle valve mechanism regulating pressure of fluid from said source in accordance with throttle position, governor valve mechanism regulating pressure of fluid from said source in accordance with the speed of rotation of one of said shafts, said bore being provided with a port in the part thereof in which said shift valve slides, fluid from said throttle valve entering said bore through said port and acting on an area of said shift valve to move said shift valve in one direction, fluid from said governor valve acting to move said shift valve in the other direction, said shift valve normally being moved from said first position to said second position over a predetermined range of opposing throttle valve pressures and governor pressures, said shift valve when in said second position covering said port and blocking the supply of throttle valve pressure to said area thereof, and means controlled by said throttle valve mechanism and operable when said shift valve is in said second position for supplying fluid from said source to one of said plug elements to move it and thereby to force said shift valve to said first position, completion of movement of said shift valve from said second position to said first position uncovering said port and restoring the supply of throttle valve pressure to said area of said shift valve and re-establishing the relation of throttle valve pressures and governor pressure for normal shifting of said shift valve from said first position to said second position.

4. In a transmission for an engine driven vehicle, an input shaft, an output shaft, a source of fluid pressure, gearing between said shafts, hydraulically actuated devices for conditioning said gearing to provide a plurality of speed ratio driving connections between said shafts, a shift valve train including as an intermediate element a shift valve so controlling supply of fluid from said source to said devices that in a first position of said shift valve said devices condition said gearing for a low speed ratio drive and in a second position of said shift valve said devices condition said gearing for a higher speed ratio drive, said shift valve train including terminal plug elements aligned with each end of said shift valve, said elements being slidable in a bore of a valve body, a throttle valve mechanism regulating pressure of fluid from said source in accordance with throttle position, governor valve mechanism regulating pressure of fluid from said source in accordance with the speed of rotation of one of said shafts, said bore being provided with a port in the part thereof in which said shift valve slides, fluid from said throttle valve entering said bore through said port and acting on an area of said shift valve to move said shift valve in one direction, fluid from said governor valve acting to move said shift valve in the other direction, said shift valve normally being moved from said first position to said second position over a predetermined range of opposing throttle valve pressures and governor pressures, said shift valve when in said second position covering said port and blocking the supply of throttle valve pressure to said area thereof, and means controlled by said throttle valve mechanism and operable when said shift valve is in said second position with said governor pressure below a predetermined maximum for supplying fluid from said source to one of said plug elements to move it and thereby to force said shift valve to said first position, completion of movement of said shift valve from said second position to said first position uncovering said port and restoring the supply of throttle valve pressure to said area of said shift valve and re-establishing the relation of throttle valve pressures and governor pressure for normal shifting of said shift valve from said first position to said second position.

5. In a transmission for an engine driven vehicle, an input shaft, an output shaft, a source of fluid pressure, gearing between said shafts, hydraulically actuated devices for conditioning said gearing to provide a plurality of speed ratio driving connections between said shafts, a shift valve train including as an intermediate element a shift valve so controlling supply of fluid from said source to said devices that in a first position of said shift valve said devices condition said gearing for a low speed ratio drive and in a second position of said shift valve said devices condition said gearing for a higher speed ratio drive, said shift valve train including terminal plug elements aligned with each end of said shift valve, said elements being slidable in a bore of a valve body, a throttle valve mechanism regulating pressure of fluid from said source in accordance with throttle position, governor valve mechanism regulating pressure of fluid from said source in accordance with the speed of rotation of one of said shafts, said bore being provided with a port in the part thereof in which said shift valve slides, fluid from said throttle valve entering said bore through said port and acting on an area of said shift valve to move said shift valve in one direction, fluid from said governor valve acting to move said shift valve in the other direction, said shift valve normally being moved from said first position to said second position over a predetermined range of opposing throttle valve pressures and governor pressures, said shift valve when in said second position covering said port and blocking the supply of throttle valve pressure to said area thereof, a spring between one end of one of said plug elements and said shift valve normally biasing said plug away from said shift valve, and means controlled by said throttle valve mechanism and operable when said shift valve is in said second position for supplying fluid from said source to one end of said one of said plug elements to move it and thereby to force said shift valve to said first position, completion of movement of said shift valve from said second position to said first position uncovering said port and restoring the supply of throttle valve pressure to said area of said shift valve and to the other end of said plug to balance pressures on the ends of said plug whereby said spring returns said plug to normal position reestablishing the relation of throttle valve pressures and governor pressure for normal shifting of said shift valve from said first position to said second position.

6. In a transmission for an engine driven vehicle, an input shaft, an output shaft, a source of fluid pressure, gearing between said shafts, hydraulically actuated devices for conditioning said gearing to provide a plurality of speed ratio driving connections between said shafts, a shift valve train including as an intermediate element, a shift valve so controlling supply of fluid from said source to said devices that in a first position of said shift valve said devices condition said gearing for a low speed ratio drive and in a second position of said shift valve said devices condition said gearing for a higher speed ratio drive, said shift valve train including terminal plug elements aligned with each end of said shift valve, said elements being slidable in a bore of a valve body, a throttle valve mechanism regulating pressure of fluid from said source in accordance with throttle position, governor valve mechanism regulating pressure of fluid from said source in accordance with the speed of rotation of one of said shafts, said bore being provided with a port in the part thereof in which said shift valve slides, fluid from said throttle valve entering said bore through said port and acting on an area of said shift valve to move said shift valve in one direction, fluid from said governor valve acting to move said shift valve in the other direction, said shift valve normally being moved from said first position to said second position over a predetermined range of opposing throttle valve pressures and governor pressures, said shift valve when in said second position covering said port and blocking the supply of throttle valve pressure to said area thereof, a spring between one end of one of said plug members and said shift valve normally biasing said plug away from said shift valve, and means controlled by said throttle valve mechanism and operable when said shift valve is in said second position with said governor pressure below a predetermined maximum for supplying fluid from said source to one end of said one of said plug members to move it and thereby to force said shift valve to said first position, completion of movement of said shift valve from said second position uncovering said port and to said first position restoring the supply of throttle valve pressure to said area of said shift valve and to the other end of said plug to balance pressures on the ends of said plug whereby said spring returns said plug to normal position reestablishing the relation of throttle valve pressures and governor pressure for normal shifting of said shift valve from said first position to said second position.

References Cited in the file of this patent

UNITED STATES PATENTS

| 2,645,135 | Frank | July 14, 1953 |
| 2,693,711 | Kelbel et al. | Nov. 9, 1954 |
| 2,770,148 | Wayman | Nov. 13, 1956 |
| 2,788,678 | Sheppard | Apr. 16, 1957 |